(12) United States Patent
Wilhelmi et al.

(10) Patent No.: US 11,558,996 B2
(45) Date of Patent: Jan. 24, 2023

(54) PLANTER WITH SEED DELIVERY APPARATUS

(71) Applicant: Kinze Manufacturing, Inc., Williamsburg, IA (US)

(72) Inventors: Matthew J. Wilhelmi, Parnell, IA (US); Marvin Bachman, Marengo, IA (US); Dustan Hahn, Tampa, FL (US); Michael J. Myers, Williamsburg, IA (US); Vaughan Stevenson, Williamsburg, IA (US); Robert Blackwell, Coralville, IA (US); Courtney N. Achen, Iowa City, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 399 days.

(21) Appl. No.: 16/690,376

(22) Filed: Nov. 21, 2019

(65) Prior Publication Data

US 2020/0084957 A1    Mar. 19, 2020

Related U.S. Application Data

(62) Division of application No. 15/701,132, filed on Sep. 11, 2017, now Pat. No. 10,485,159, which is a
(Continued)

(51) Int. Cl.
*A01C 7/20* (2006.01)
*A01C 7/04* (2006.01)

(52) U.S. Cl.
CPC .............. *A01C 7/20* (2013.01); *A01C 7/206* (2013.01); *A01C 7/046* (2013.01)

(58) Field of Classification Search
CPC ........... A01C 7/20; A01C 7/046; A01C 7/206; A01C 7/00; A01C 7/044; A01C 7/042; A01C 7/04
See application file for complete search history.

(56) References Cited

U.S. PATENT DOCUMENTS

| 2,605,023 A | 7/1952 | Ward |
| 3,133,515 A | 5/1964 | Beebe |
(Continued)

FOREIGN PATENT DOCUMENTS

| EP | 2636294 A1 | 9/2013 |
| RU | 2496293 C1 | 10/2013 |
| UA | 24512 A | 10/1998 |

OTHER PUBLICATIONS

International Searching Authority Search Report, Issued in connection to International Application No. PCT/US2015/015424, 9 pages, dated Feb. 11, 2015.

*Primary Examiner* — Christopher J. Novosad
(74) *Attorney, Agent, or Firm* — McKee, Voorhees & Sease, PLC

(57) ABSTRACT

An agricultural implement includes a number of row units. The row units include one or more seed meters for receiving, singulating, and dispensing seed to the ground such that preferred spacing of subsequent seed is attained. Seed delivery systems are included to aid in transporting the seed from the seed meter to the ground in a controlled manner to mitigate skips and to aid in controlling the spacing of the seeds, which can be based upon the ground speed of the implement as it moves through the field. The seed delivery systems can control the transport of the seed to a furrow in the field such that the seed can experience zero or near zero relative velocity so that the seed will have little to no movement once positioned in the furrow.

18 Claims, 15 Drawing Sheets

Related U.S. Application Data division of application No. 14/619,758, filed on Feb. 11, 2015, now Pat. No. 9,756,779.

(60) Provisional application No. 61/938,370, filed on Feb. 11, 2014.

(56) References Cited

U.S. PATENT DOCUMENTS

| | | |
|---|---|---|
| 3,272,159 A | 9/1966 | Sanderson |
| 3,964,639 A | 6/1976 | Norris et al. |
| 4,002,266 A | 1/1977 | Beebe |
| 4,285,444 A | 8/1981 | Tye |
| 4,628,841 A | 12/1986 | Powilleit |
| 5,842,428 A | 12/1998 | Stufflebeam et al. |
| 6,477,967 B2 | 11/2002 | Rosenboom |
| 6,505,569 B1 | 1/2003 | Richard |
| 6,564,730 B2 | 5/2003 | Crabb et al. |
| 6,651,570 B1 | 11/2003 | Thiemke |
| 6,681,706 B2 | 1/2004 | Sauder et al. |
| 7,343,868 B2 | 3/2008 | Stephens et al. |
| 8,371,240 B2 | 2/2013 | Wollenhaupt et al. |
| 8,375,873 B2 | 2/2013 | Nelson et al. |
| 8,752,490 B2 | 6/2014 | Beaujot |
| 8,985,037 B2 | 1/2015 | Radtke et al. |
| 9,155,241 B2 | 10/2015 | Rans et al. |
| 9,756,779 B2 | 9/2017 | Wilhelmi et al. |
| 10,485,159 B2 * | 11/2019 | Wilhelmi ................ A01C 7/20 |
| 2003/0159631 A1 | 8/2003 | Sauder et al. |
| 2004/0134399 A1 | 7/2004 | Stephens et al. |
| 2011/0178632 A1 | 7/2011 | Straeter |
| 2012/0031315 A1 | 2/2012 | Beaujot |
| 2012/0312212 A1 | 12/2012 | Cruson |
| 2015/0059630 A1 | 3/2015 | Kinzenbaw et al. |
| 2015/0217943 A1 | 8/2015 | Friestad et al. |
| 2015/0319919 A1 | 11/2015 | Sauder et al. |
| 2016/0143213 A1 | 5/2016 | Kowalchuk |

* cited by examiner

PLANTER WITH SEED DELIVERY APPARATUS

CROSS-REFERENCE TO RELATED APPLICATIONS

This application is a Divisional Application of U.S. Ser. No. 15/701,132, filed on Sep. 11, 2017, which is a Divisional Application of U.S. Ser. No. 14/619,758, filed Feb. 11, 2015, now U.S. Pat. No. 9,756,779, issued on Sep. 12, 2017, which claims priority under 35 U.S.C. § 119 to provisional application U.S. Ser. No. 61/938,370, filed Feb. 11, 2014, which are all herein incorporated by reference in their entirety.

FIELD OF THE INVENTION

The present invention relates generally to agricultural implements. More particularly, but not exclusively, the invention relates to an agricultural planter with a seed delivery apparatus for delivering seed from a metering system of a row unit to a furrow created in the ground.

BACKGROUND OF THE INVENTION

An agricultural row crop planter is a machine built for distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Seed spacing in the seed furrow is controlled by varying the rotational speed of the seed disc. Most commonly, seed disc rotation is driven by connection to a common driveshaft. The driveshaft runs horizontally along the length of the toolbar to connect to each row unit, and is driven by a single motor or a ground contact wheel. In this configuration, the planting rate can be adjusted for all row units uniformly by adjusting the rotational speed of the common drive shaft. This can be a tedious task, and an operator is unlikely to adjust the gear ratio as often as necessary to maximize yields. Generally, an optimal overall rate for a given acreage will be selected prior to planting and will be maintained at that rate regardless of soil conditions. Whether using a mechanical, air, or vacuum style seed disc, the seed disc is installed inside of the seed meter using independent fasteners and requires the use of tools to facilitate changing the disc. For example, if a farmer uses the same planter to plant corn and soybeans, he would use a different disc for the respective seed types. With planters continuing to grow in size, and more row units being added, the task of changing seed discs using independent fasteners and tools adds unnecessary burden to changing out seed discs.

More recently, planters have been designed to provide for independent driving of each of the seed discs in each seed meter. The meters include a motor, such as an electric motor, that is attached to the meter. The output shaft extends from the motor and into the meter such that a portion of the shaft is operatively connected to the seed disc. Therefore, the motor will operate to rotate the seed disc.

The most common seed delivery system for delivering seed from the seed disc to the furrow may be categorized as a gravity drop system. In the case of the gravity drop system, a seed tube has an inlet end, which is positioned below the seed metering system. The singulated seeds from the seed metering system drop into the seed tube and fall via gravitational force from a discharge end thereof into the seed trench. Monitoring systems are commonly used to monitor the operation of the planter. Such systems typically employ a seed sensor attached to each seed tube to detect the passage of seed therethrough.

However, such a gravity system can affect the seed spacing of the planter. For example, as the spacing of the speed is dependent on the rotational velocity of the seed disc and the gravitational constant, interruptions, forces, or other occurrences acting on the seed can greatly affect the spacing. For example, if the seed bumps against a wall of the seed tube on the way to the furrow; this can cause a delay or a non-vertical fall of the seed. If a preceding or following seed does not experience the same interruption, the seeds could be spaced too close or far from one another.

Furthermore, as the speed of planting increases, this causes additional problems. Drawing a planting implement through the field at faster speeds increases the speed of deposited seeds relative to the ground, causing seeds to roll and bounce upon landing in the trench or furrow and resulting in inconsistent plant spacing. The adverse agronomic effects of poor seed placement and inconsistent plant spacing are well known in the art.

Therefore, there is a need in the art for an agricultural planting implement that includes a seed delivery apparatus that aids in delivering seed from a singulating seed meter to a furrow or trench in the field, such that the spacing of adjacent seed is more consistent to increase the yield obtained of the end crop.

SUMMARY OF THE INVENTION

Therefore, it is a principal object, feature, and/or advantage of the present invention to overcome the deficiencies in the art.

It is another object, feature, and/or advantage of the present invention to provide an agricultural planter with a seed delivery apparatus to provide consistent spacing between adjacent seed.

It is yet another object, feature, and/or advantage of the present invention to provide a seed delivery apparatus, mechanism, and/or assembly that will deliver a seed from a seed metering device to the field.

It is still another object, feature, and/or advantage of the present invention to provide a seed delivery apparatus that will provide optimized spacing in a seed furrow.

It is a further object, feature, and/or advantage of the present invention to provide a seed delivery apparatus that will allow for planting with increased speed.

It is still a further object, feature, and/or advantage of the present invention to provide a seed delivery apparatus that provides for seed spacing that will not be influenced by abrupt forces during travel.

It is yet another object, feature, and/or advantage of the present invention to provide a controlled delivery of seed from a seed meter to the ground wherein a seed experiences near zero relative velocity during drop, regardless of the velocity of the planter.

These and/or other objects, features, and advantages of the present invention will be apparent to those skilled in the art. The present invention is not to be limited to or by these objects, features and advantages. No single embodiment need provide each and every object, feature, or advantage.

The present invention relates to various seed delivery systems for providing a desired, equidistant spacing of seed in a field, regardless of the speed of travel of an agricultural planter. Some aspects of the systems can include that the delivery of the seed from a seed meter to a trench or furrow in the ground will not be influenced by factors such as external forces, including the free fall of gravity. Furthermore, at least some of the systems provide setups that provide that the seed will be release with substantially zero relative velocity such that the seed will land softly within a trench or furrow, and will have little to no bounce therein, which will aid in the correct spacing of the seed.

Figure 1:
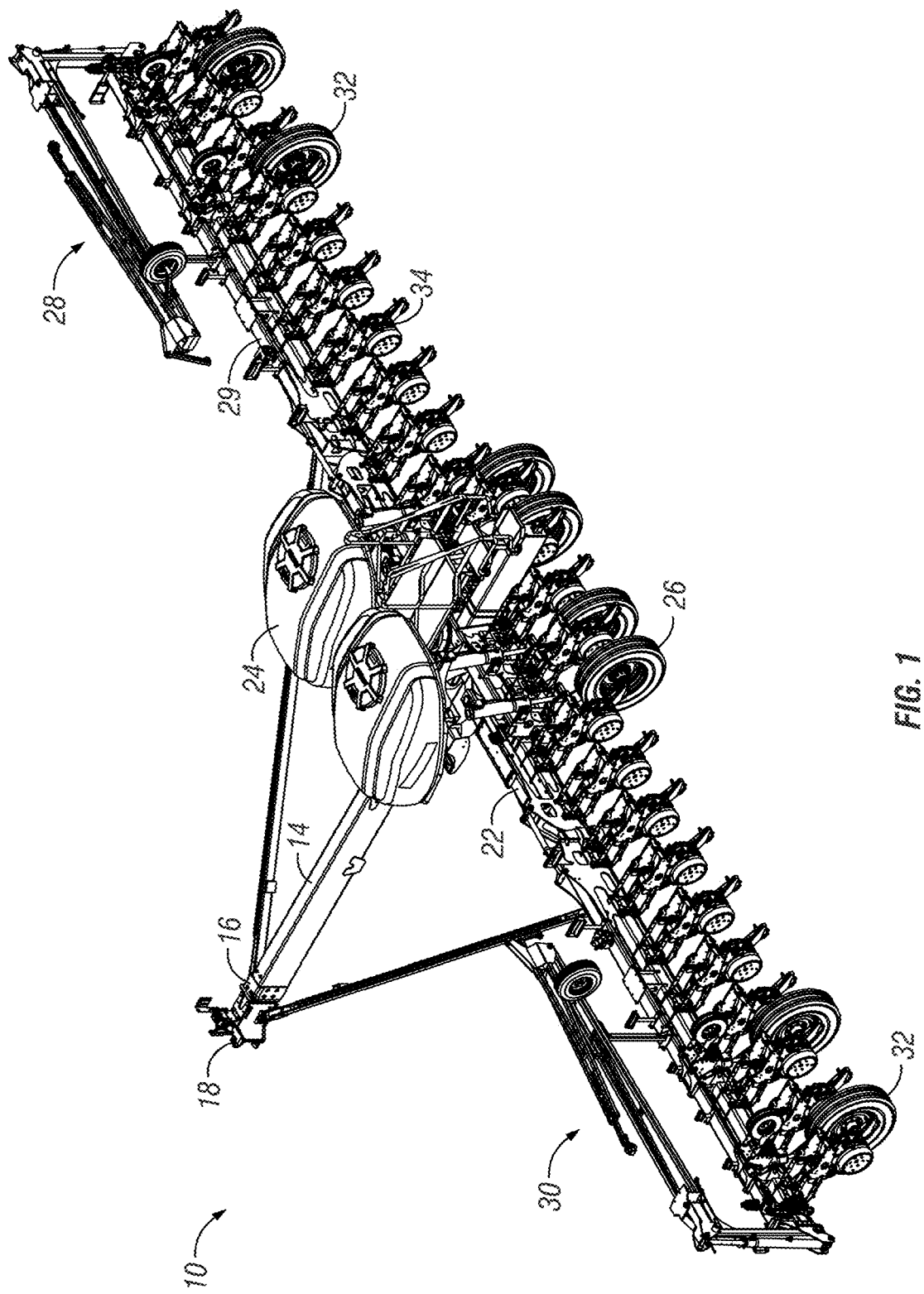
FIG. 1 is a perspective view of a planting implement.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 shows an agricultural implement 10, in this case, an agricultural planter. The planter 10 is usually attached to and pulled by a tractor. However, it should be appreciated that other equipment and/or vehicles may move the implement 10. For purposes of the present disclosure, the implement 10 will be referred to as a planter.

The planter 10 includes a tongue 14 having a first end 16 and an opposite second end (not shown). The tongue 14 includes a hitch 18 at the first end 16, with the hitch 18 being connected to the tractor. At the opposite end of the tongue 14 is a central tool bar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 3:
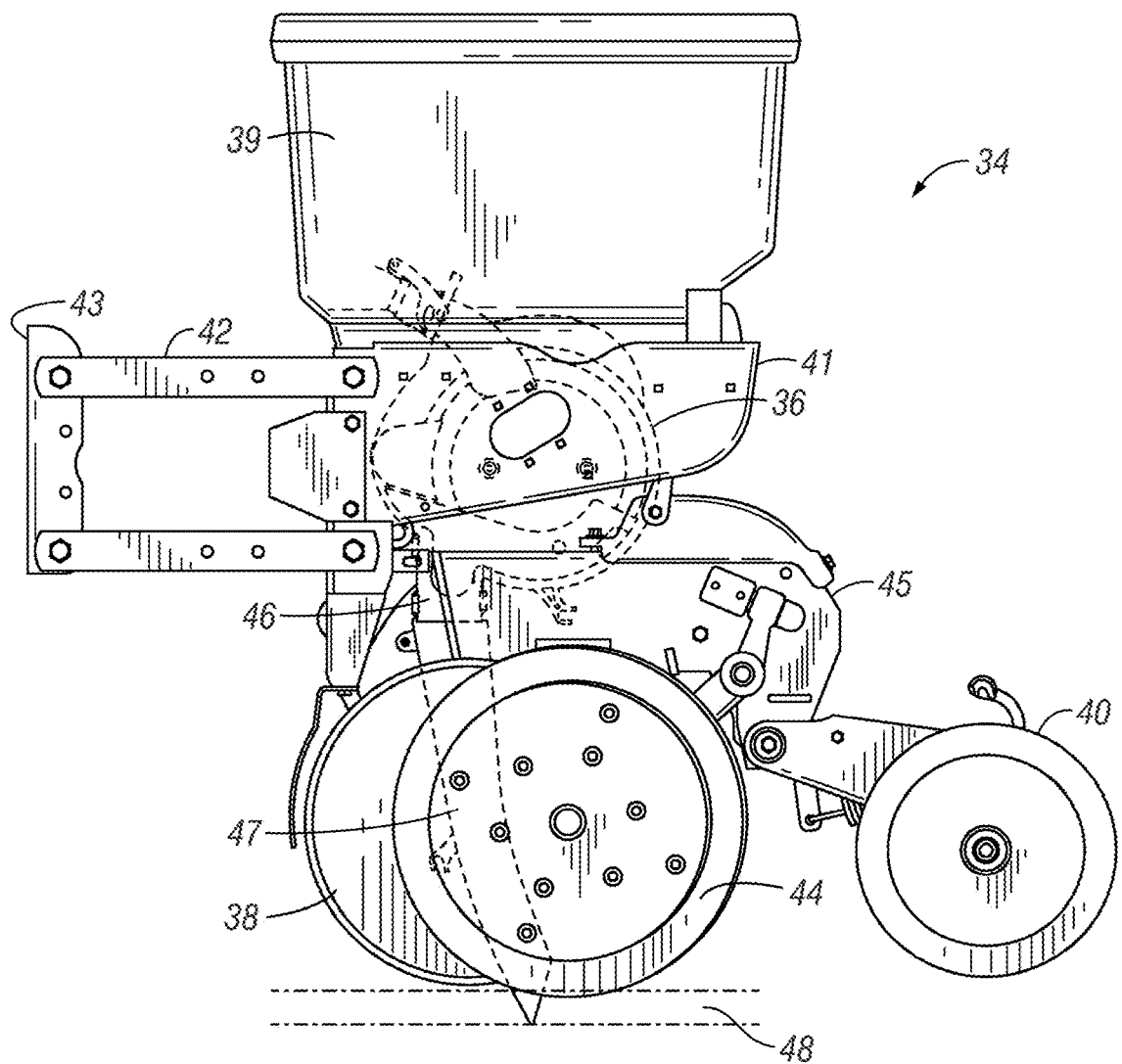
FIG. 3 is a side elevation view of another row unit showing a seed meter and seed tube of row unit according to some embodiments of the invention.

As shown in FIG. 1, central hoppers 24 are positioned at the central toolbar 22. The hoppers 24 are configured to store seed, fertilizer, insecticide, or other types of material for use in farming. The hoppers 24 may both contain the same material, or could contain separate materials. The use of the central hoppers 24 allows for a large amount of material to be added and stored at a centralized location. However, the invention also contemplates the use of one or more hoppers positioned at each of the row units 34 for providing seed to be planted at the row units, as is shown in FIG. 3. When central hoppers 24 are used at the central toolbar 22, it should be appreciated that the central hoppers will be in fluid communication with each of the row units 34. This can be done by use of separate hoses to each of the row units, or fewer hoses that include splitters, wherein the hose is split to provide seed or other material to more than one row unit. Also connected to the central toolbar is a plurality of central wheels, which may be known as transport wheels 26 extending generally downwardly from the central toolbar 22. The wheels 26 contact the ground and support the central hoppers 24. The wheels stabilize the implement 10 and are the wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the understanding that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may be seeders, fertilizers, insecticide sprayers, or other dispensers, discs, or plows. The wings 28, 30 may also include at least one fold cylinder and a down force cylinder. It is further contemplated that multiple down force cylinders be used with an implement having more sections. The fold cylinder(s) is configured to fold the wings to a position wherein the first and second wings 28, 30 are generally adjacent the tongue 14 of the implement 10.

Figure 2:
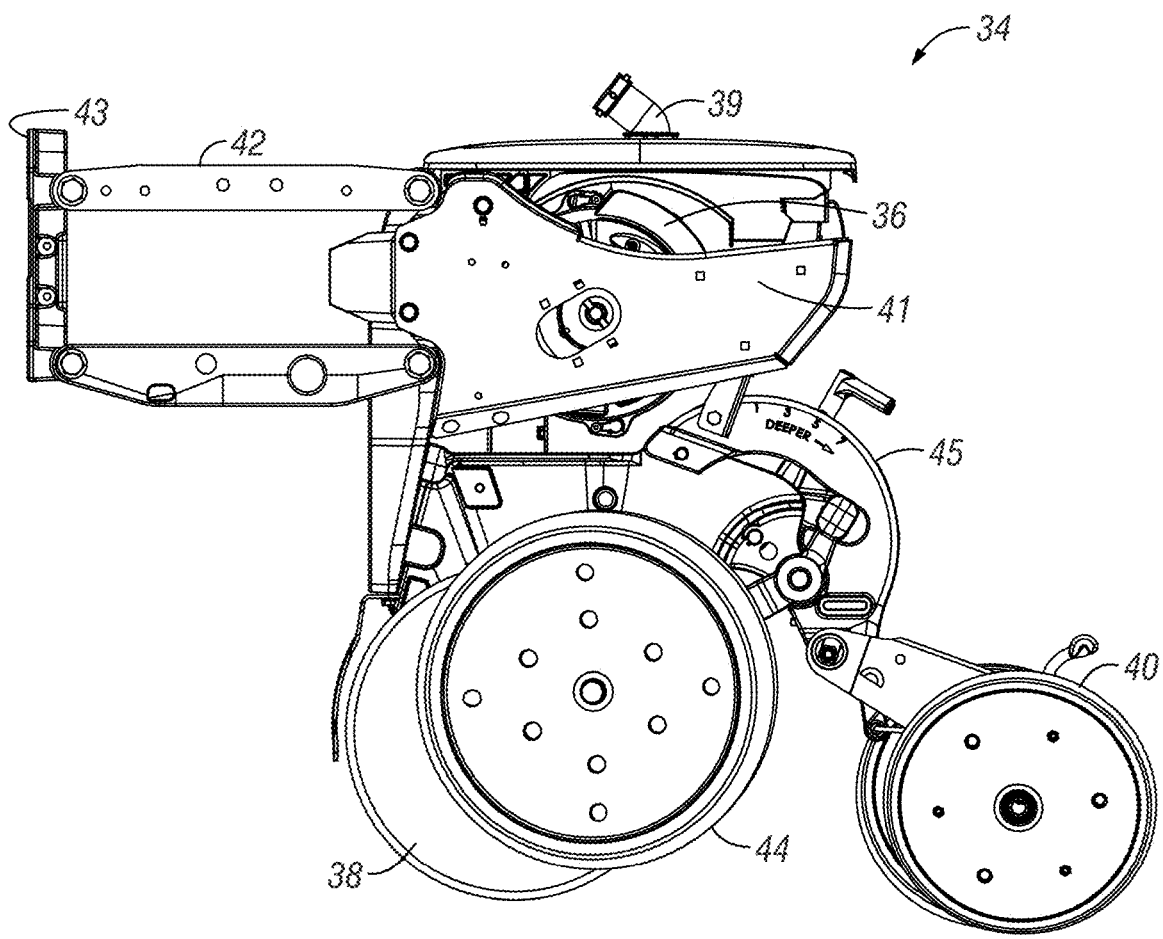
FIG. 2 is a side elevation view of a row unit for use with a planting implement.

FIG. 2 is a side elevation view of a row unit 34, and more specifically, a seeder including a singulating seed meter 36 for use with the present invention. The row unit 34 includes a seed meter 36, furrow opener 38, row hoppers 39, and furrow closer 40. Other aspects of the row unit 34 shown in FIG. 3 include a frame 41, linkage 42, mount 43 for mounting to the planter 10, gauge wheels 44, and depth control mechanism 45. The gauge wheels 44 and depth control mechanism 45 work together to control the depth of the furrow or trench created by the opener 38. Furthermore, the row hopper 39 is connected to a seed supply, such as the central hoppers 24 via air seed delivery system, which can provide the seed meter 36 of each row unit 34 with seed to be planted. The seed meter can be generally any air or mechanical meter capable of singulating seed and delivering seed from the meter 36 via a seed chute 46 extending therefrom.

Figure 4:
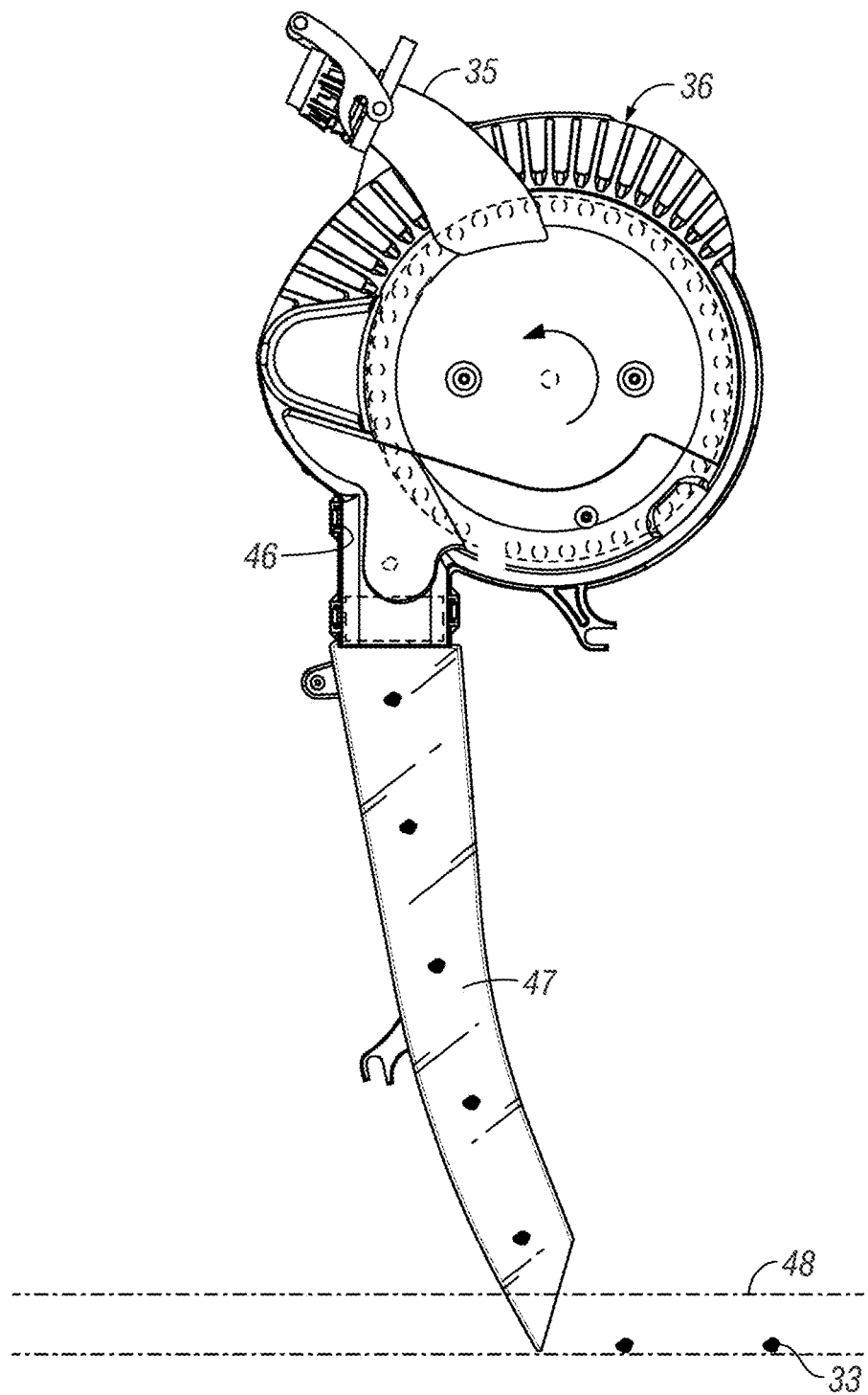
FIG. 4 is a side elevation view of the seed meter and seed tube of row unit of FIG. 3.

FIG. 3 is a side elevation view of another embodiment of a row unit 34 according to exemplary aspects of the present invention. The row unit 34 shown in FIG. 3 includes a row hopper 39, which is capable of storing seed or other granular or particulate matter to be dispensed by the row unit 34. Other components of the row unit 34 shown in FIG. 3 are similar to those shown in the embodiment of FIG. 2. As shown in generally dashed lines in FIG. 3, and in more detail in FIG. 4 is a seed meter 36 with a seed tube 47 attached thereto. The seed meter 36 may be an air seed meter or a mechanical seed meter, such as a finger brush seed meter. The seed meter 36 includes a seed disc 37 rotating within the housing thereof. The seed disc 37 includes a plurality of radially spaced seed apertures comprising a seed path. The seed apertures of the seed path pass through a pool of seed where the seed is temporarily attached or affixed to the seed apertures. The seed disc with the attached thereto continues rotation through a singulating mechanism, otherwise known as a seed singulator. A seed singulator 35 includes one or more protrusions positioned on opposite sides of the seed path to make sure that a single seed is attached to each single seed aperture. Thus, the seed singulator prevents or mitigates the chance of doubles being planted.

After passing through the seed singulating mechanism 35, the seed attached to the seed disc 37 continues rotation until it reaches a release point. Such a release point may coincide with a zero pressure differential location or an ejector mechanism within the seed housing of the seed meter 36. Generally located adjacent the release point for the seed meter 36 is a seed chute 46 extending as part of the housing of the seed meters 36. The seed chute 46 is configured to begin directing the seed from the seed meter towards the furrow 48 in the ground. Further shown in FIGS. 3 and 4 is a seed tube 47 separate from and attached to the seed chute 46. The seed tube 47 is a mechanism, which is known in the art to further provide a path for the seed 33 to travel after being released from the seed disc 37. Therefore, as shown in FIG. 4, a plurality of seed 33 is passing through the seed tube 47 and into the furrow 38. The rotation of the seed disc 37 within the seed meter 36 will control the spacing of the seed 33 within the furrow 48. For example, matching the rotational velocity of the seed disc 36 to the traveling velocity of the tractor and planter 10 will provide for seed being evenly spaced throughout a field. However, as the seed is being passed through the seed tube 47, it may interact with the walls of the seed tube 47, which can disrupt the falling speed of the seed 33 as it passes through the seed tube. Such a disruption can cause the seed to not fall at a constant speed. This can create uneven spacing of seed, as some seed will bounce off the walls, and others will not. Therefore, the seeds may be too close or too far from one another within the furrow 48. Such an uneven spacing can cause a seed to battle over nutrients and water, or possibly be planted too far apart from one another. All of these issues can create a lower than desired yield obtained by a farmer.

Therefore, the embodiments of the present invention will provide for improvements to the prior art seed delivery systems, which may be seed tubes 47, such that equal distant spacing of the seed 33 and furrow 48 is obtained. The embodiments herein shown and described will provide for a more consistent and even spacing of the seed, regardless of the plantar velocity of travel, as well as without regard to external forces (gravity, obstructions, elevation, slope, etc.) acting on the row units 34 of the planter 10. The various seed delivery systems of the present invention will thus increase the yield obtained by a farmer by providing a higher consistency of seed spacing, such that the seeds will receive their required nutrients and such that the full area of the field being planted will be utilized by the planting of the seed.

Figure 5:
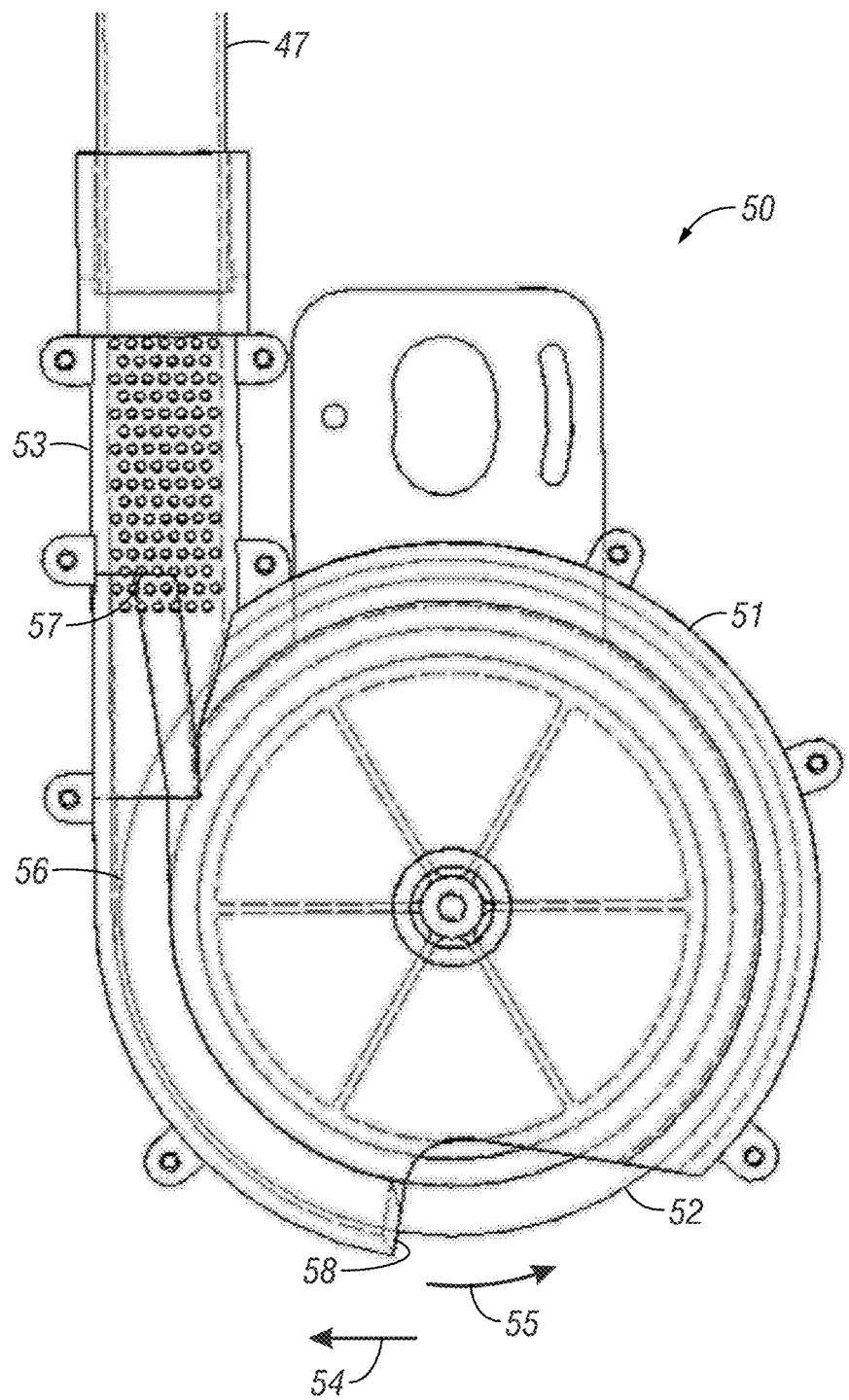
FIG. 5 is a side elevation view of an exemplary seed delivery apparatus for use with the row unit according to the invention.

Therefore, FIG. 5 shows an embodiment of a seed delivery or dispensing system 50 according to some embodiments of the invention. The seed delivery system 50 shown in FIG. 5 includes a housing 51. Extending from the housing 51 is an attachment area or neck 53, which is attached to a portion of a seed tube 47 or a seed chute 46. For example, it is contemplated that the seed delivery system 50 shown in FIG. 5 may be positioned generally adjacent or close to the ground of the field. Therefore, a seed tube 47 can still be utilized to provide an enclosed member for the seed to pass after being released from the seed disc of the seed meter 36. However, the mechanism 50 can also be attached generally adjacent the seed chute 46 and be sized with a diameter such that the seed may not pass through a seed a seed tube 47, such that it will not bounce off the walls of said seed tube 47.

The seed dispensing system 50 further includes a wheel 52 housed within the housing 51 and rotatably attached thereto such that the wheel 52 is able to rotate therein. The wheel 52 may comprise a pliable material, such as foam, rubber, or other compressible or otherwise deformable materials. The diameter of the wheel 52 is slightly less than diameter of the housing 51, such that the wheel is able to rotate within the housing 51 with minimal distance between the outer edge of the wheel 52 and the interior of the wall of the housing 51. A motor, such as a stepper motor (not shown) is also operably attached to the wheel 52 to provide rotational velocity thereto. For example, the stepper motor may include a belt extending between an output shaft of the motor and the axis of the wheel 52 to provide rotation thereto. Also shown in FIG. 5 is a vented area 57 on the neck or attachment portion 53 of the housing 51. As will be understood, the vented portion provides a pressure differential to exhaust air of the mechanism to slow down seed that is passing from the seed meter towards the seed delivery system 50.

In operation, seed is released from the seed disc 37 of the seed meter 36 and allowed to pass through the tube 47. When the seed meter 36 is an air seed meter, excess air may be pushing the seed down the seed tube 47. The vented portion 57 of the neck 53, which may comprise a plurality of apertures through the wall of the neck 53, can allow for the excess air to be released, which will aid in slowing down the seed as it passes through the neck portion 53. Seed will then continue towards a pinch point 56 between the outer portion of the wheel 52 and the interior of the wall of the housing 51. Such a pinch point is shown as numeral 56 in FIG. 5. The pliable wheel can be partially deformed at the point of the seed to allow the seed to affix at a location on an outer profile of the wheel 52 as it rotates within the housing 51. Therefore, the continued rotation of the wheel 52, shown as the arrow 55 in FIG. 5, will move the seed about the housing 51 and towards a release point 58, wherein the seed will be released from the wheel 52 and deposited in the furrow 48 in the field. Thus, the seed delivery system 50 shown in FIG. 5 provides for a system in which the seed is pinched between the wheel 52 and the interior of a wall of the housing 51 to move the seed through the housing in a controlled manner such that the rotational velocity of the wheel 52 will control the spacing and delivery of the seed in a field.

The wheel 52 and housing 51 may be sized such that they minimize the drop distance from the seed disc 37 to the ground, which would eliminate the length of the seed tube 47 between the release point from the seed disc and the entrance into the housing 51. In addition, the invention contemplates that the wheel 52 may comprise many different sizes, which can account for different seed types, speeds of travel, or other factors that may affect the planting rate of a seed.

Advantages of the seed delivery system 50 shown in FIG. 5 are numerous. For example, the controlled rotation of the wheel 52 in the housing 51 will reduce the amount of bounce and the possibility of bounce of a seed as it passes through a seed tube. Furthermore, the rotational velocity shown by the arrow 55 of the seed tube can be matched with the velocity of the tractor shown by the arrow 54, such that the seed will experience generally zero relative velocity at the point of release 58. Therefore, the seed will drop substantially straight from the seed disc 52 so that each seed will not bounce within the furrow. In other words, the wheel can be traveling at the same velocity as the planter as the planter moves through the field and can be adjusted accordingly such that a change in planter velocity can cause a similar change in rotational velocity of the wheel 52 as the planters move, which will provide for a consistent and even spacing of the seed in the field. Furthermore, it should be appreciated that there will likely be multiple seeds positioned between the wheel 52 and the housing wall at the same time, such that the continued rotation of the wheel will release seed at the release point 58 on a continued basis to provide for the desired spacing of the seed in the field. Stopping the rotation of the wheel 52 will stop the planting of the seed, wherein the seed will be maintained in position between the wheel and the wall of the housing, such as when the tractor is turning or otherwise in a position where seed is not to be planted.

Figure 6:
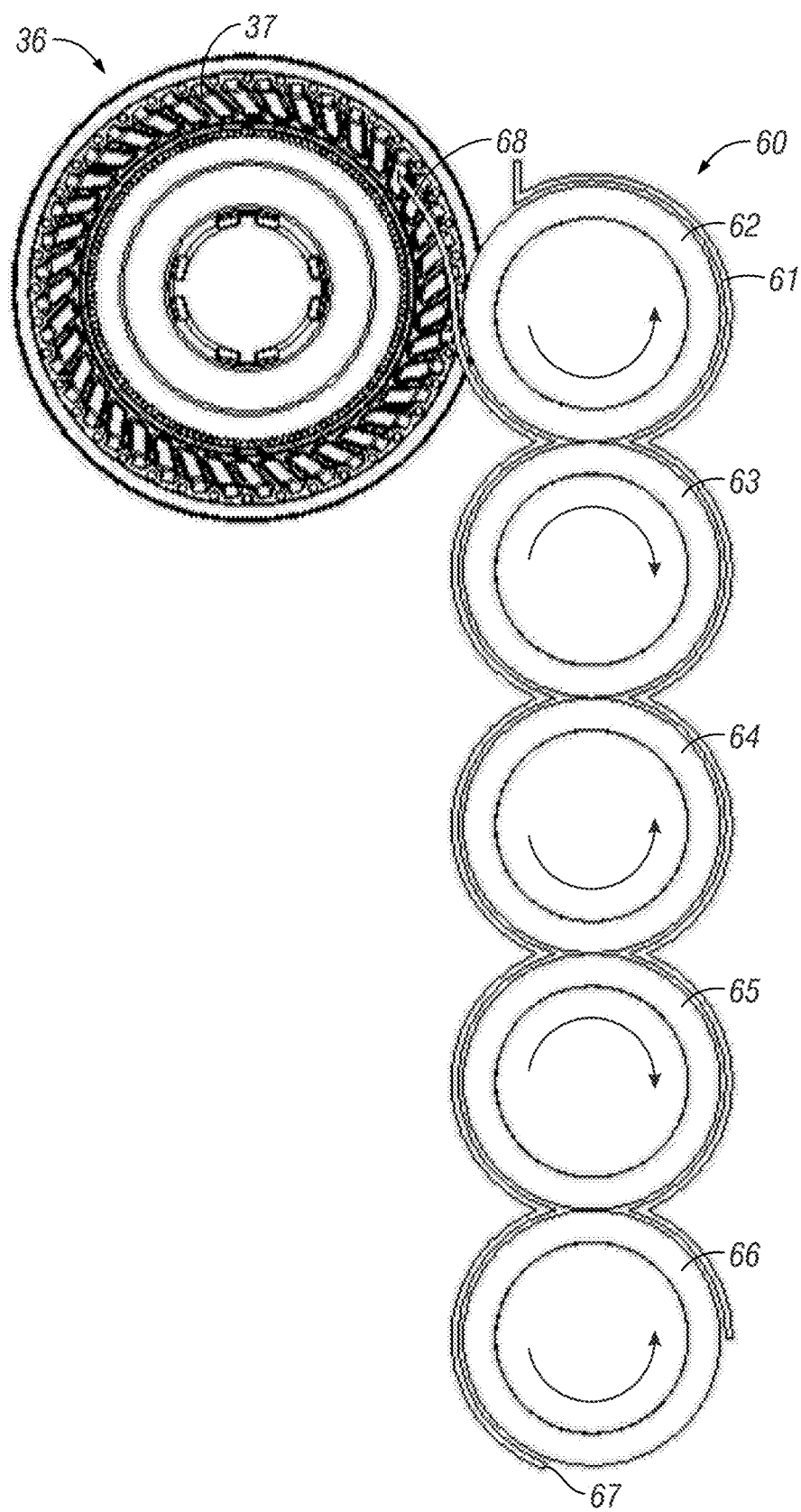
FIG. 6 is a side elevation view of another exemplary embodiment of a seed delivery apparatus for use with the row unit according to the invention.

FIG. 6 shows yet another embodiment of a seed delivery system 60 according to aspects of the present invention. The seed delivery system 60 shown in FIG. 6 is advantageous as the delivery of the seed from the seed disc 37 to the ground will not be affected by some external forces, such as upward forces felt by a row unit 34 as the row unit runs into a bump or other obstruction in the field. In other words, the system 60 shown in FIG. 6 provides a controlled delivery of the seed directly from the seed disc 37 to the ground.

The seed delivery system 60 includes a housing 61 enclosing a plurality of wheels therein, with the wheels being rotatably positioned within the housing 61. The housing 61 includes a protrusion 68 extending at least partially into a portion of the seed meter 36 such that seed released from the seed apertures of the seed disc 37 will interact with the protrusion 68 and be directed into the housing 61. The wheels, which include a first wheel 62, second wheel 63, third wheel 64, fifth wheel 65, and Nth wheel 66, wherein the Nth wheel equals the total number of wheels used based upon the height and diameter of wheels, comprise a pliable or deformable material, similar to that as the wheel 52 shown in FIG. 5. Therefore, as the wheels rotate relative to one another within the housing 61, a seed can be pinched between the various wheels and a wall of the housing such that the seed will be transported from an upward position relative the protrusion 68 to a lower position relative the final release point 67. The relative rotational direction of the wheels are shown in FIG. 6 for exemplary purposes, and are not to be intended as sole rotational direction of the wheels.

As mentioned, the number of wheels for use with the seed delivery system 60 can be varied according to various factors. The diameter of the wheels, the height of the seed meter, the type of seed, the speed of travel, etc., all are factors that can affect the number of wheels used with the system.

In operation, a seed is released from the seed disc 37 and positioned between the first wheel 62 and a wall of the housing 61. The rotation of the wheel 62 moves the seed towards the second wheel 63, where it becomes affixed thereto and positioned between the second wheel 63 and a wall of the housing 61. The continued rotation of the second wheel 63 will move the seed towards the third wheel 64, where it will be positioned between the third wheel 64 and the wall of the housing 61. This will continue on through the next wheel 65 and any additional wheels towards the final wheel, which is shown as numeral 66 in FIG. 6. The rotation of the final wheel 66 will move the seed towards the release point 67, where it will be released from the seed delivery system 60 into the furrow or positioned at the ground in the field. The rotation of the plurality of wheels will control and provide for the spacing of the seed as it moves from the seed disc 37 and towards the release point 67. Furthermore, it should be appreciated that the system will be moving multiple seeds through the wheels at the same time, in order for the seeds to be released at the desired spacing. Each of the wheels can be independently controlled by either a single motor with belts or gears attaching to the wheels, or by individual motors that directly control each wheel, such that the seed can be hurried or slowed as it passes through the plurality of wheels in order to match the velocity of the planter as it moves through the field and in order to provide for consistent and equidistant spacing of the seeds through the field. The independent control also allows for the stopping of the rotation of the wheels in order to stop the planting of the seed, either temporarily or for permanently. The restarting of the rotation of the wheels will continue the planting of the seed as previously mentioned. Furthermore, in the embodiment shown in FIG. 6, the seed does not experience any sort of free fall or be subjected to gravitation such that the seed delivery is fully controlled as it moves through the housing 61. This will negate any influence of external forces, such as the sudden upward force caused by a bump or other obstruction in a field.

Figure 7:
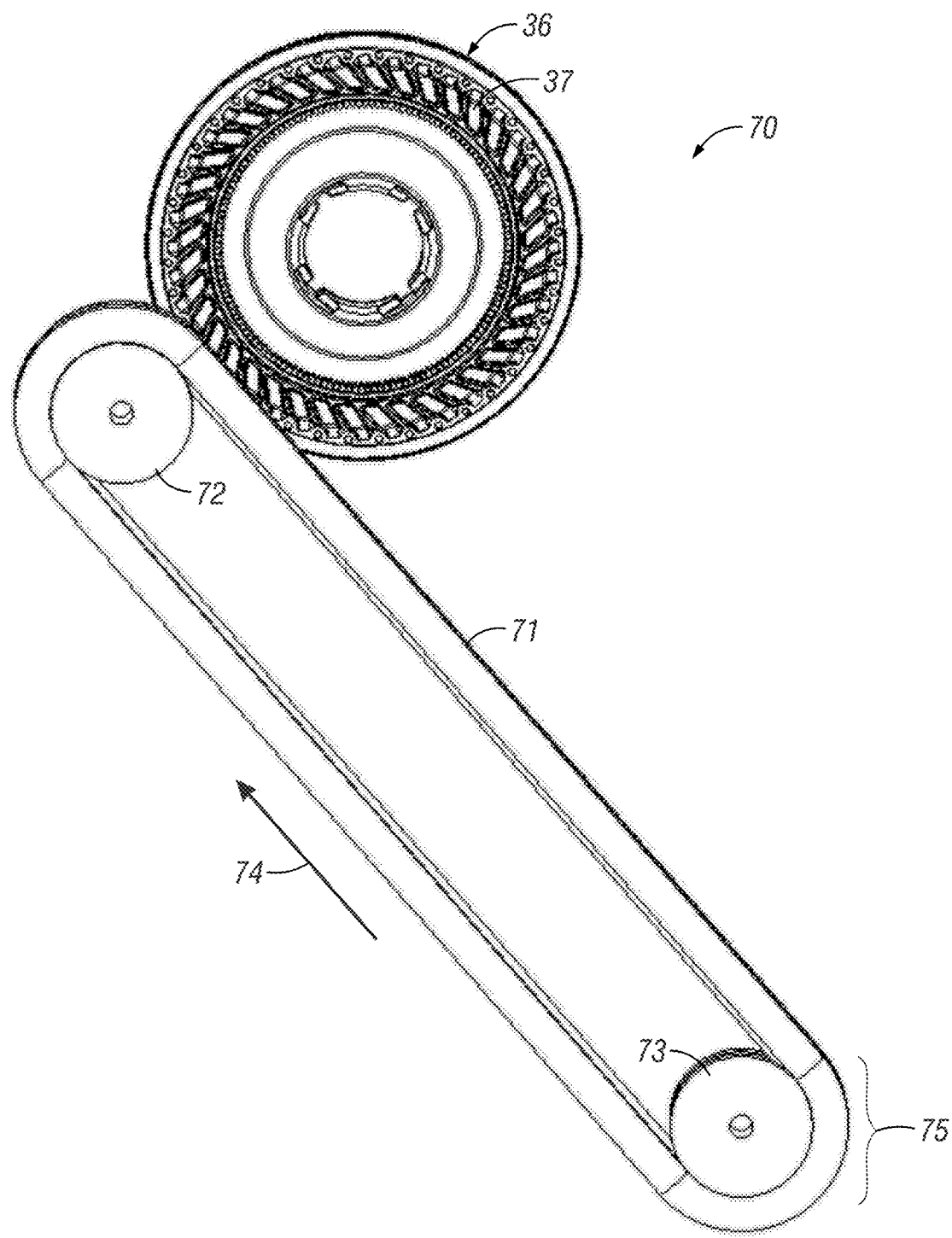
FIG. 7 is a side elevation view of another exemplary embodiment of a seed delivery apparatus using a belt according to the invention.

FIG. 7 shows yet another embodiment of a seed delivery system 70 according to aspects of the present invention. The embodiment shown in FIG. 7 includes a seed belt 71 rotated in the direction of the arrow 74 by a first roller 72 and second roller 73. The seed belt 71 is positioned to pass adjacent the seed path of the seed disc 37, and therefore can be at least partially positioned within the seed meter 36 or outside the seed meter 36 such that the seed can be directed to the belt 71. The seed belt 71 can be a bulb seal belt such that a gap or pocket in the belt is able to frictionally hold the seed in place at a location as it is released from the seed disc 37, such that the movement of the belt 71 will carry and deliver the seed from the seed disc 37 to a release point 75 adjacent a furrow in the field. Therefore, the use of the belt 71 of the seed delivery system 70 will also provide an apparatus and method or delivering the seed such that the seed does not free fall under gravitational force, which will negate or otherwise mitigate issues coming therefrom.

Figure 8:
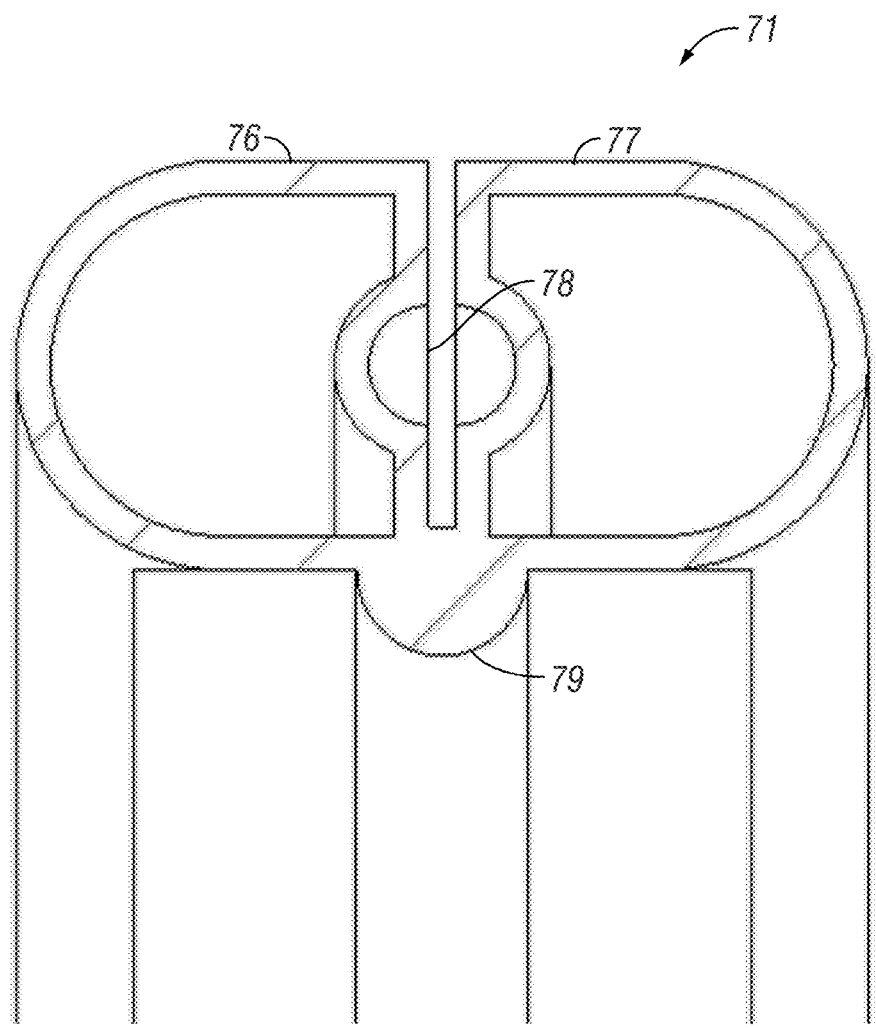
FIG. 8 is a sectional view of the belt of FIG. 5.

A cross-section of the seed belt 71 is shown in FIG. 8. As mentioned, the seed belt 71 may be a bulb seed belt such that it comprises a first bulb 76 and second bulb 77, which are hingeably movable relative to one another via the hinge 79. This allows the bulb sections 76, 77 to open and close relative one another to allow a seed to be deposited adjacent a seed pocket or gap 78 between the first and second bulb sections 76, 77 of the seed belt 71. The seed can be injected or otherwise positioned within the seed pocket or gap 78 between the bulbs 76, 77, wherein the bulbs will be returned adjacent one another to hold the seed in place as the belt continues rotation through the system. Once the seed reaches the release point or a position close thereto, the bulbs 76, 77 can be re-opened to allow the seed to be dispensed therefrom. Furthermore, a scraper or ejector (not shown) can be added adjacent the release point 75 of the seed delivery system 70 to provide additional mechanisms for the release of the seed from the belt 71.

Therefore, in operation, the seed belt 71 is configured to move in the direction shown by the arrow 74 in FIG. 7, with the rotational velocity substantially matching the velocity of the planter in the field. Again, this will provide that the seed experiences zero relative velocity at the release point, to reduce, mitigate, or otherwise prevent bouncing of the seed in the seed furrow or trench. As a portion of the belt reaches the upper roller 72, which may be near the seed disc 37, a portion of the seed meter or a protrusion therefrom, such as a V-shaped member or protrusion, may open the first and second bulbs 76, 77 of the belt 71, such that a seed that is released from the seed disc 37 is deposited into the gap or pocket 78 of the belt 71. The bulbs 76, 77 are then allowed to rotate relative one another adjacent to one another via the hinge 79 to close, in which case the seed will be held in place within the gap or pocket 78. The belt 71 will continue movement and additional seeds will be dispensed within gaps at equal spacing of the belt 71. As the belt reaches the lower roller member 73, an opener, scraper or ejector mechanism can be positioned in order to open the bulbs 76, 77 and/or provide a protrusion to release the seed from within the seed pocket 78 to be released adjacent the seed release point 75 and into a furrow or trench in the field. The continued movement of the belt 71 about the rollers 72, 73 will continuously provide seed to the furrow or trench in equidistant spacing. Furthermore, as the rollers can be operably attached to one or more motors, the velocity of the rotation of the belt 71 can be continuously updated, such as automatically updated to match the ever changing speed of the tractor through the field. This will further aid in providing equidistant spacing of the seed.

Figure 9:
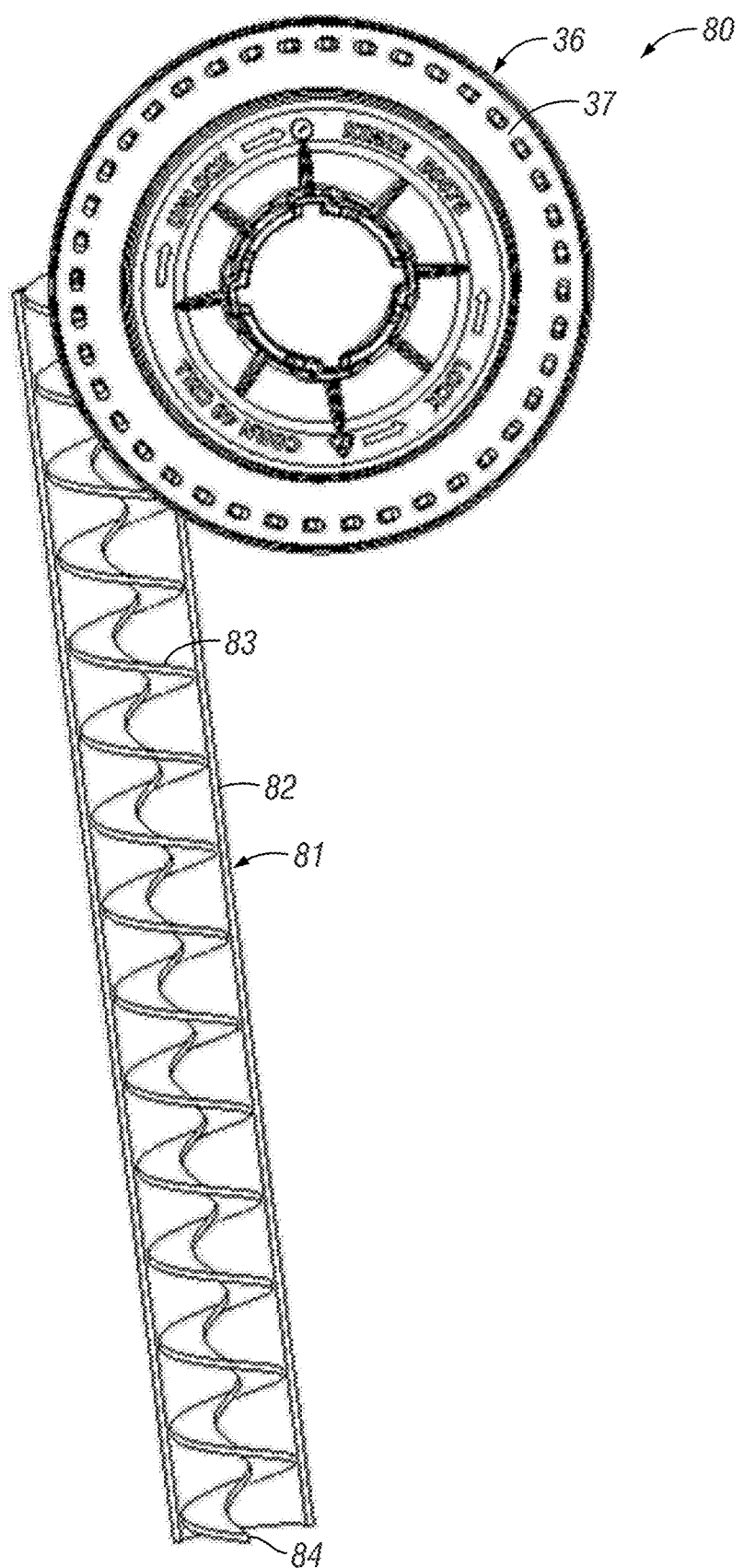
FIG. 9 is a side elevation view of yet another embodiment of a seed delivery apparatus according to the invention.

FIG. 9 provides yet another embodiment of a seed delivery system 80 according to embodiments of the present invention. The seed delivery system 80 includes a seed drill 81 operably attached or positioned near a seed disc 37 of a seed meter 36. The seed drill 81 includes a housing 82 and a drill 83 rotatably positioned within the housing 82. The drill 83, which may also be known as an auger, can interact with the seed disc 37 to remove the seed from the seed apertures thereon to position it on the drill 83 as the drill rotates within the housing 82. Furthermore, an ejector mechanism or other release mechanism could release seed from the disc 37 to position the seed on the drill 83 of the seed drill 81. The drill 83 can include flighting or other housing mechanisms to control the movement of the seed as the drill 83 rotates. Such flighting can prevent the seed from simply sliding down the sloped drill.

In operation, the rotation of the drill 83 within the housing 82 of the seed drill 81 is configured to match the velocity of the planter as it moves through the field. Thus, the rotation of the drill 81 will provide that seed will be evenly and equidistantly spaced in a field as the planter moves through the field, regardless of the speed of the planter. Therefore, the invention contemplates that a motor may be connected to the drill 83 to continuously update the rotation of said drill as the rotation of the velocity of the planter changes. Seed is released from the seed disc 37 to the drill 83, by the drill itself or by an ejector mechanism. The seed is carried by the rotation of the drill 83 through the housing 82 and towards the release point 84, wherein it is delivered to the furrow or trench in the field. Thus, as the seed is constantly being added to the drill, the continued rotation will cause the seed to be evenly spaced through the field as the planter moves therethrough.

FIGS. 10-15 show an embodiment of a seed delivery system 90 according to additional aspects of the invention. The seed delivery system 90 includes a belt 91 moved by rollers 92. One or the rollers or more than one of the rollers can be connected to a motor, such as a stepper motor via gears or a belt, in order to provide a rotational velocity thereto. The belt 91 is positioned generally adjacent the seed disc 37 such that the movement of the belt shown by the arrow 93 will work with the rotational spin and velocity of the seed disc, which is shown by the arrow 95 in FIG. 15. This will further work with the direction and velocity of travel shown by the arrow 94 of the planter as it moves through the field. Seed will be released from the seed disc 37 and positioned at or temporarily attached to the belt 91, such that the belt will carry the seed towards the trench or furrow in the ground. The controlled delivery of the seed via the seed belt 91 will provide for a more consistent and equidistant spacing of the seeds, regardless of change in velocity of the planter, external forces, and substantially without the influence of gravity.

Figure 10:
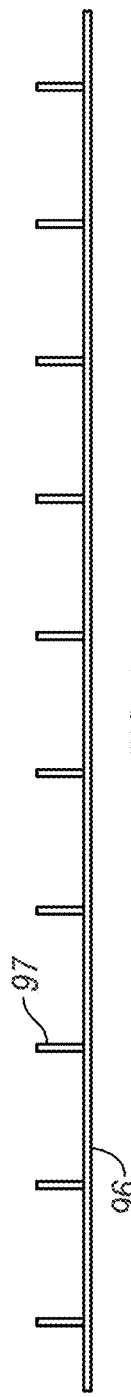
FIG. 10 is a side elevation view of a belt in an open configuration for use with a seed delivery apparatus according to aspects of the invention.
Figure 11:
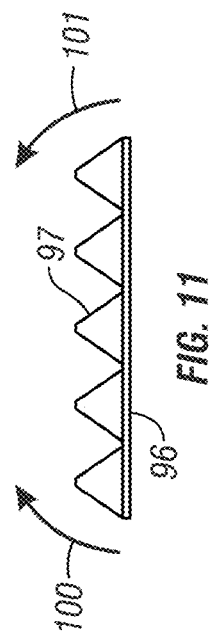
FIG. 11 is an end view of the belt of FIG. 10.
Figure 12:
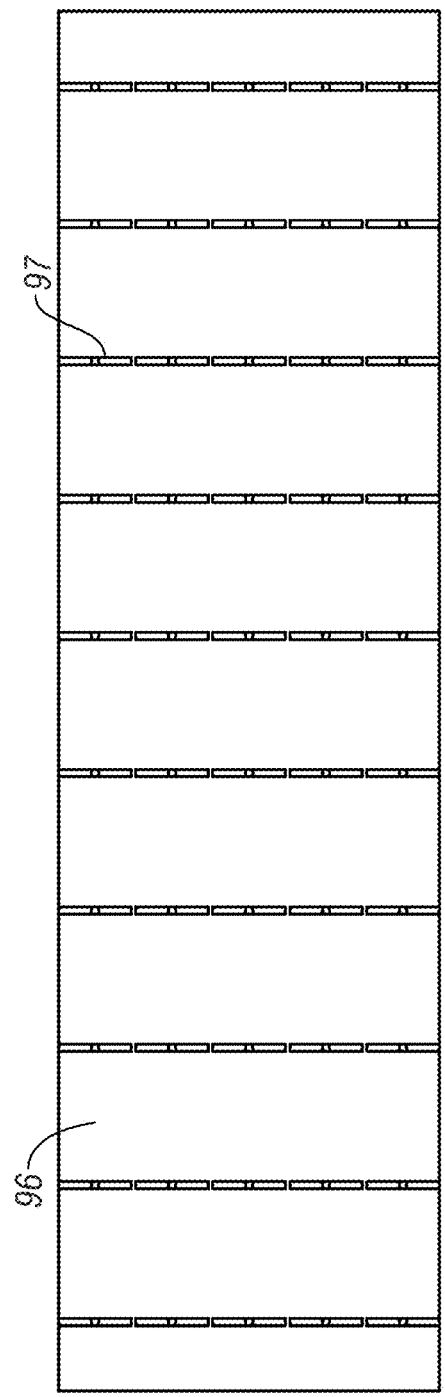
FIG. 12 is a top plan view of the belt of FIG. 10.
Figure 13:
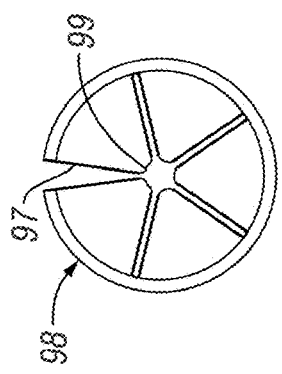
FIG. 13 is an end view of the belt of FIG. 10 is a rolled up configuration.
Figure 14:
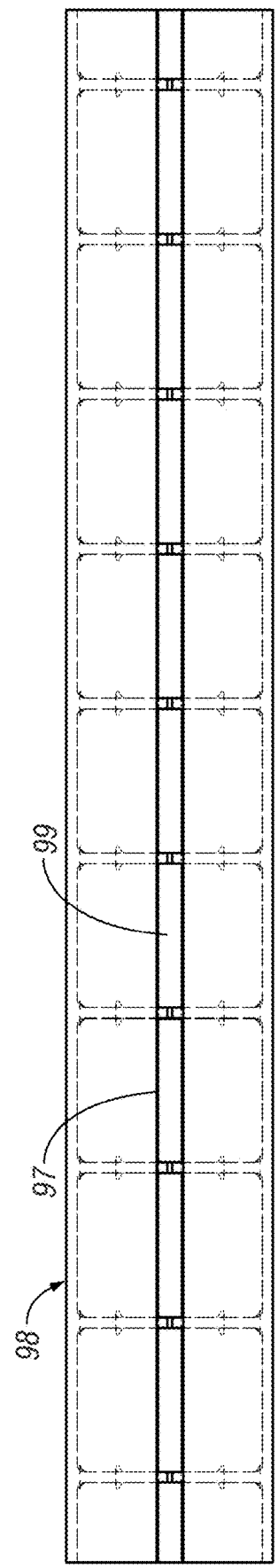
FIG. 14 is a top plan view of the belt of FIG. 13.
Figure 15:
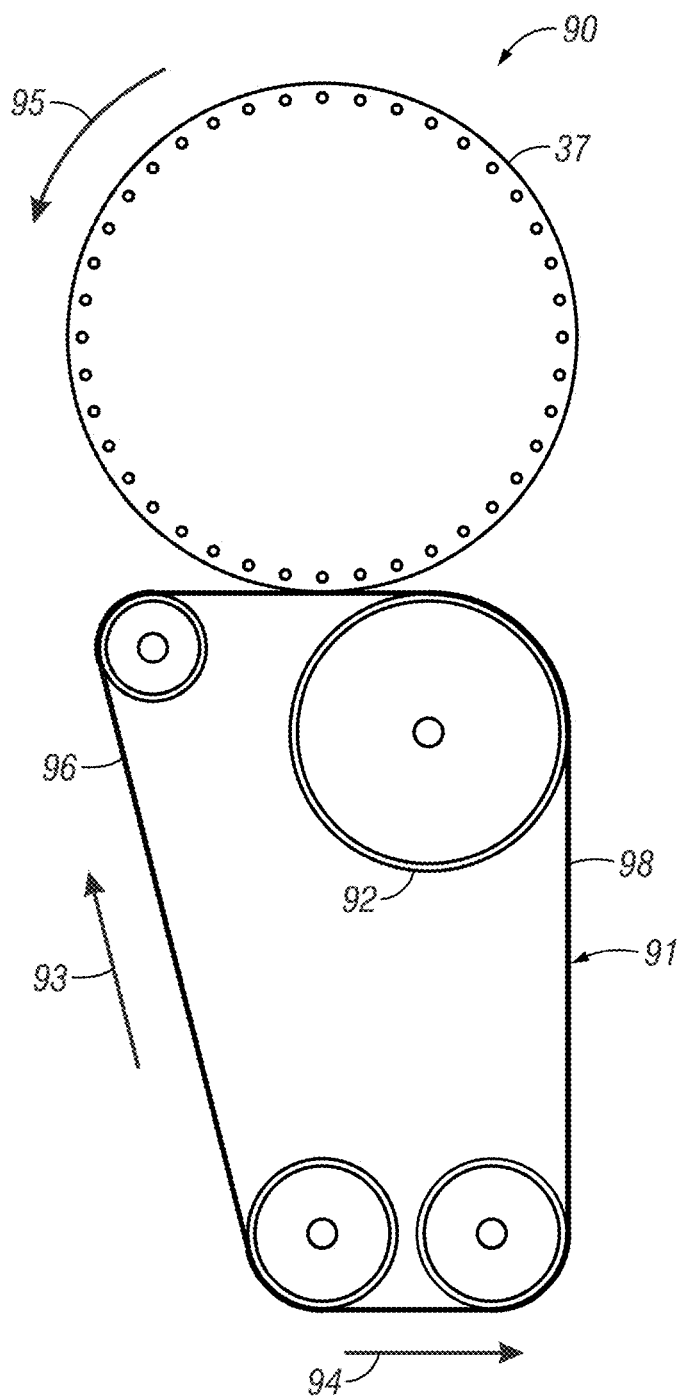
FIG. 15 is a side elevation view of a seed delivery apparatus utilizing the belt of FIGS. 10-14.

As shown in the Figures, the seed belt 91 includes an open position shown by reference numeral 96 (see, e.g., FIG. 11) and a closed position shown by reference numeral 98 (see, e.g., FIG. 13). The belt 91 in the open position shown by numeral 96 is a cross-sectional view of the belt, such that the belt is shown to be moving into or out of the page, whiles FIGS. 10 and 12 show side and top views of the same. As shown in the Figures, the belt includes a plurality of teeth 97, extending generally outwardly from the belt. As the belt 91 passes adjacent the seed disc 37, it will pass through a closing or rolling mechanism, wherein the belt will be rolled upon itself as shown by the arrows 100, 101 in FIG. 11. This will cause the outer teeth 97 of the belt 91 to begin to roll towards each other in a generally upward manner (or downward manner if the configuration is reversed), and towards the configuration shown by the reference numeral 98. Before the belt is closed or substantially closed, a seed is released from the seed disc 37 and can be positioned between the teeth 97 into a pocket or gap 99, as shown in FIGS. 13 and 14. The rolling mechanism can continue to close the teeth upon each other to the configuration shown by the reference numeral 98. The belt 91 can remain in the closed or substantially closed configuration as it passes a vertical portion of the seed delivery system 90 and towards the ground. As the seed housed within the teeth 97 of the belt 91 reach or nears a release point, the belt 91 can be allowed to reopen, such that the teeth will be unhinged towards the open configuration shown by the reference numeral 96. Such an opening will release the seed from the belt 91 at a desired location and into a furrow. The belt 91 can be configured to pass the ground relatively close to the ground such that the seed will not experience much free fall between the belt 91 and the ground, which will reduce the bounce of the seed in the bottom or the trench or furrow.

As the belt 91 continues moving and receiving and releasing seed, the belt 91 will provide for a consistent and equidistant release of the seed to provide for equispacing of the seed as the planter moves through a field. In addition, the speed of the belt 91 on the rollers 92 can be adjusted by a motor or motors operably attached to the rollers 92 in order to match or substantially match the velocity of the planter as it moves through the field. Therefore, the seed belt 91 of the seed dispensing system 90 provides for yet another way for the seed to be controlled from the seed disc 37 into the ground such that the system 90 will provide equispacing of the seed, regardless of the speed of the planter. Furthermore, as the seed is controlled within the belt 91 during rotation of the belt from the seed disc to the ground, the spacing of the seed in the field will not be influenced by external forces, such as bumps, gravity, or other forces acting on the row unit and/or planter.

Figure 16:
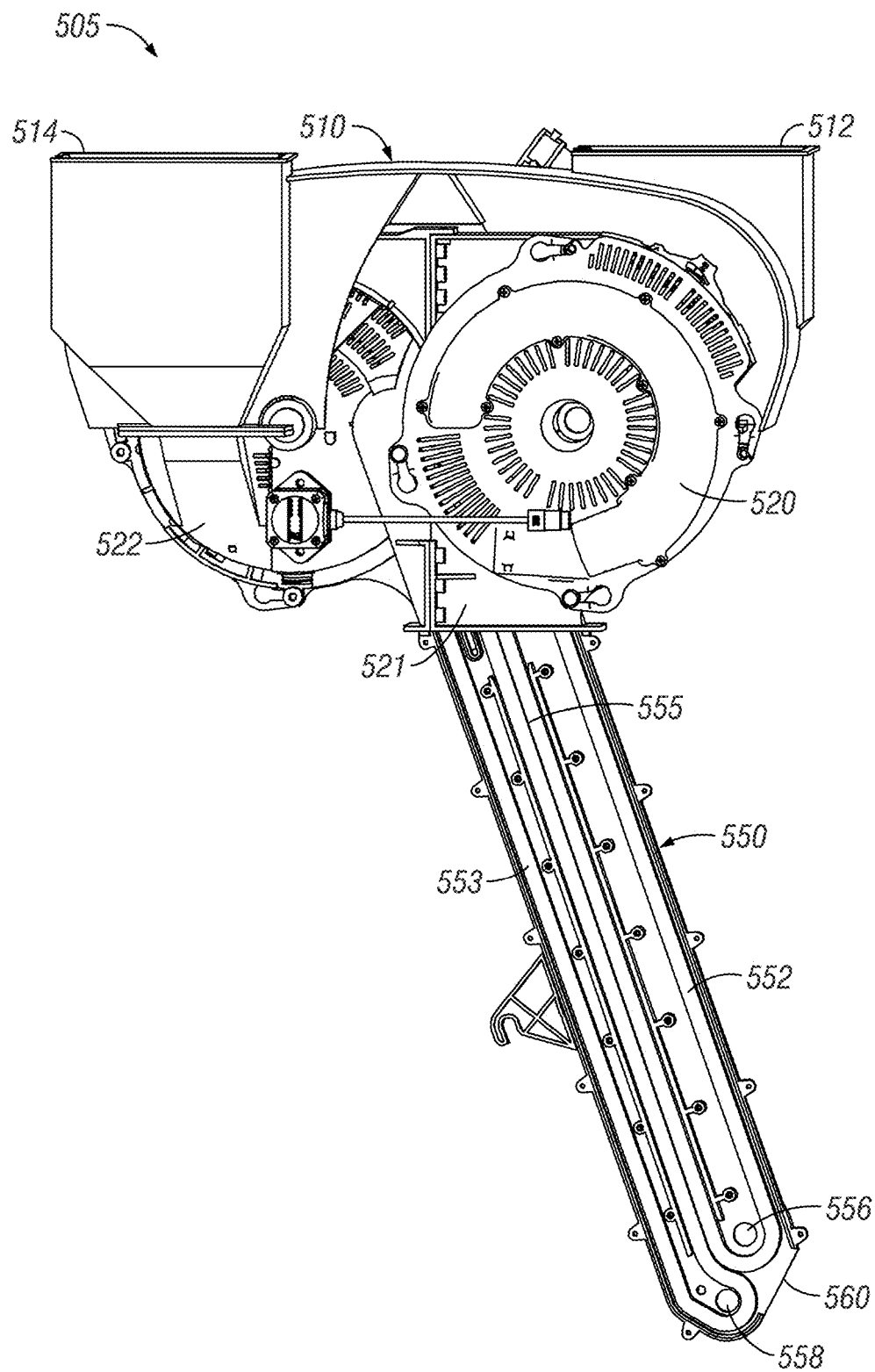
FIG. 16 is a side elevation view of another seed delivery apparatus according to aspects of the invention.
Figure 17:
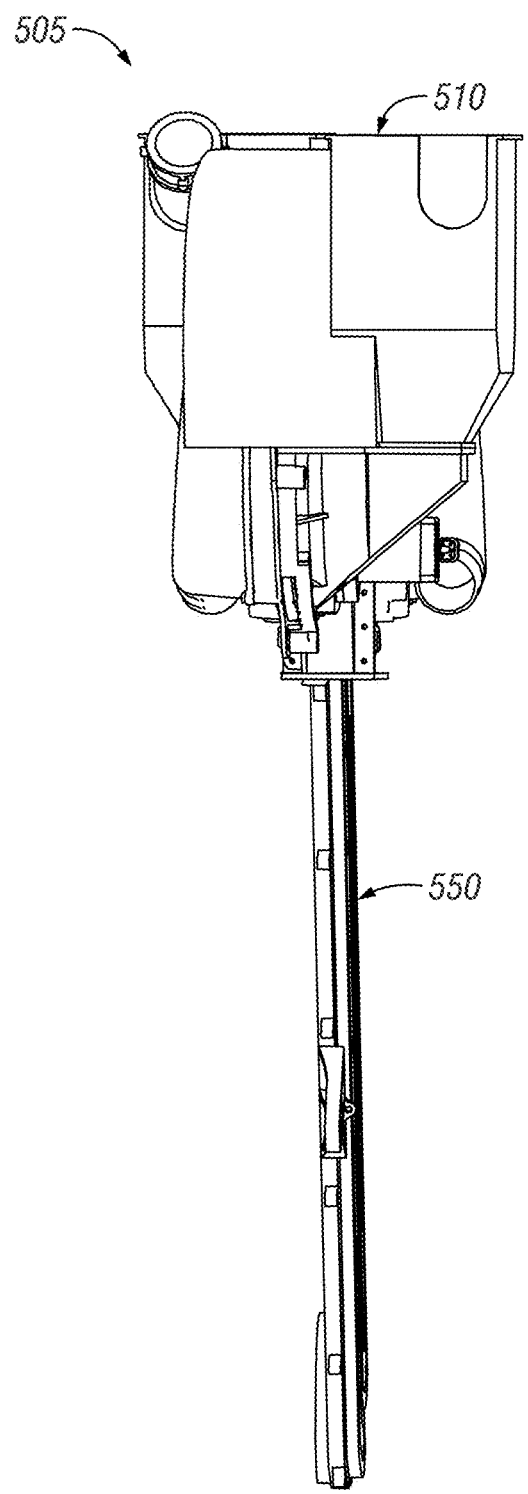
FIG. 17 is an end view of the apparatus of FIG. 16.
Figure 18:
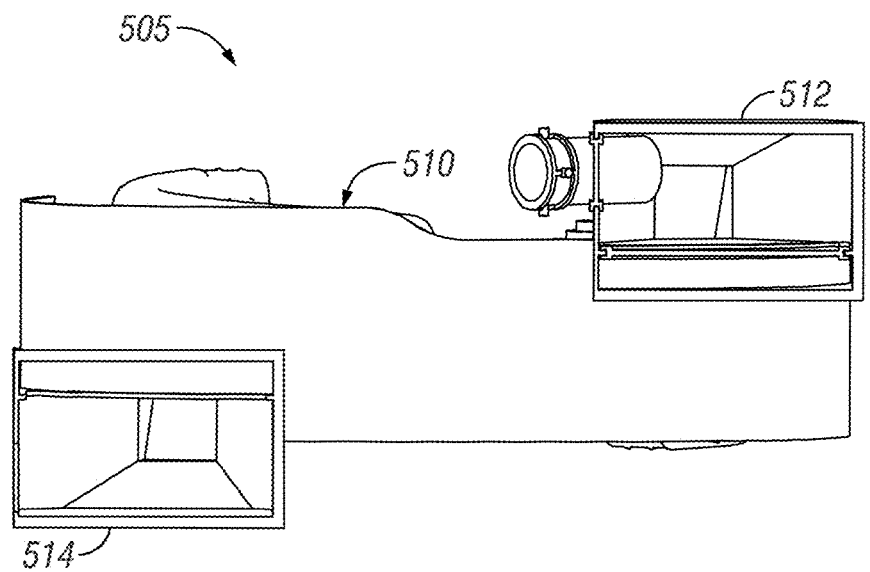
FIG. 18 is a top plan view of the apparatus of FIG. 16.

FIGS. 16-18 show a metering system 505 for use with a row unit and showing yet additional aspects of seed delivering apparatuses according to the invention. As shown, the system includes a housing 510 that provides for the shared housing for at least a portion of a first meter 520 and a second meter 522 and also includes a first hopper portion 512 and a second hopper portion 514. Thus, seed can be delivered, such as by air seed delivery to the hopper portions 512, 514 to be delivered to the seed meters 520, 522. Furthermore, one of the seed meters will be operating to singulate and dispense one of the seed types at a time. For example, either the first or the second meter 520, 522 will be operated but not both at the same time. The operating meter will release a seed approximately at the location of the common or shared seed chute 521, which is adjacent a seed-to-ground delivery system 550. However, it is also contemplated that both of the meters could be operated at the same time. This would be a way to do very high planting rates, effectively cutting the needed metering rate by each meter in half. The operation of both meters would ensure that the meters are on-the-ready to plant when needed, or could simply be planting alternatively as the planter goes through the field.

The seed-to-ground delivery system 550 is a system which includes a first belt 552 and a second belt 553. The belts are tensioned and comprise an elastomeric material. Any pliable material is contemplated to be used for the belt materials. The first belt 552 is positioned on a first roller 556 and includes a motor for rotating the belt. Likewise, the second belt 553 includes a second roller 558 that is operably attached to a motor that provides for the rotation of the second belt 553. The belts will rotate in a manner such that they will move substantially in sync with one another. Spacing between the first and second belts at the location 555 can be such that a seed can fit in between the pliable materials of the belts, but can be held in place thereat. Thus, when seed is released by one of the first or second meters 520, 522, the seed can be placed between the two belts. As the belts rotate, they will carry or deliver the seed between the belts towards the exit 560, which is substantially adjacent, a furrow in the field.

The rotational speed of the belts can be configured with the travel speed of the planter in with the known height about the furrow bottom of the belt opening 560 such that the seed will experience generally zero relative velocity when landing in the furrow. This will prevent the seed from bouncing or otherwise moving in the furrow which will increase the accuracy of the seed spacing between adjacent and subsequent seeds.

The seed belt provides the advantage of controlling the seed from the release of the seed from a seed meter and to the location of the seed-to-ground opening 560, which is substantially adjacent the bottom of a furrow in the field. Thus, the control delivery of the seed will provide for greater accuracy and seed spacing and seed placement in the ground such that it will have its best chance of growing when recovered with dirt.

Thus, various configurations of seed delivery systems have been shown and described. It should be appreciated that the system shown and described are for exemplary purposes, and the invention of a controlled system for delivering seed from a singulating seed meter to the ground to provide for consistent and equidistant spacing of the seed in the ground has thus been provided. It is to be contemplated that numerous variations, changes, and otherwise, which are obvious to those skilled in the art are to be considered part of the present invention.

What is claimed is:

1. A seed delivery system, comprising:
a housing including an inlet at an upper portion and an outlet at a lower portion; and
at least three alternatingly rotating wheels in the housing, wherein the at least three alternatingly rotating wheels:
are aligned along an axis passing through a center of each wheel,
receive seed from a seed meter at the inlet of the housing, and
transport seed from a first side of the axis to second side of the axis and back to the first side of the axis in a controlled manner towards the outlet of the housing.

2. A row unit for use with an agricultural implement, comprising:
at least one seed meter comprising a seed disc and a seed exit; and
the seed delivery system of claim 1 for transporting seed from the seed meter to a furrow in the ground.

3. The row unit of claim 2, wherein the at least three alternatingly rotating wheels comprise resilient wheels adjacent one another in a substantially vertical manner.

4. The row unit of claim 2, wherein the housing of the seed delivery system comprises a lip extending at least partially into the seed meter to guide the seed from the meter to a first wheel within the housing.

5. The row unit of claim 2, wherein said seed delivery system further comprises at least one electric motor operatively connected to the at least three alternatingly rotating wheels to control the rotational velocity of said wheels.

6. The row unit of claim 5, further comprising a plurality of electric motors, with each motor operatively connected to a wheel to provide the rotational velocity for said wheel.

7. The row unit of claim 5, wherein each of the at least three alternatingly rotating wheels is sized to pinch a seed between the wheel and a portion of the housing as the seed moves toward the ground.

8. The row unit of claim 5, wherein at least a bottom-most wheel has a rotational velocity such that the seed will experience a net zero horizontal velocity when entering the furrow.

9. The row unit of claim 2, further comprising a blocking member adjacent the inlet of the housing to direct seed from the seed meter into the housing.

10. An agricultural planter, comprising:
a plurality of row units positioned on a toolbar, each of said plurality of row units comprising a seed meter and the seed delivery system of claim 1.

11. The agricultural planter of claim 10, wherein the at least three alternatingly rotating wheels comprise a pliable or deformable material.

12. The agricultural planter of claim 10, further comprising a blocking member adjacent the inlet of the housing to aid in directing seed from the seed meter into the seed delivery system.

13. The agricultural planter of claim 10, wherein a bottom-most wheel of the at least three alternatingly rotating wheels has a rotational velocity to release seed with a directional component from the housing, wherein the speed of the seed at the directional component is substantially equal and opposite to the ground speed of the agricultural planter at the row unit.

14. The agricultural planter of claim 10, wherein the at least three alternatingly rotating wheels are sized to pinch a seed between a wheel and a wall of the housing.

15. The seed delivery system of claim 1, wherein the at least three alternatingly rotating wheels comprise a pliable or deformable material.

16. The seed delivery system of claim 1, wherein the wheels are adjacent one another in a substantially vertical manner.

17. The seed delivery system of claim 1, wherein a bottom-most wheel of the plurality of wheels has a rotational velocity to release seed with a directional component from the housing, wherein the speed of the seed at the directional component is substantially equal and opposite to the ground speed of an agricultural planter at a row unit.

18. The seed delivery system of claim 1, further comprises at least one electric motor operatively connected to the at least three alternatingly rotating wheels to control the rotational velocity of said at least three alternatingly rotating wheels.

* * * * *